Figure 1:
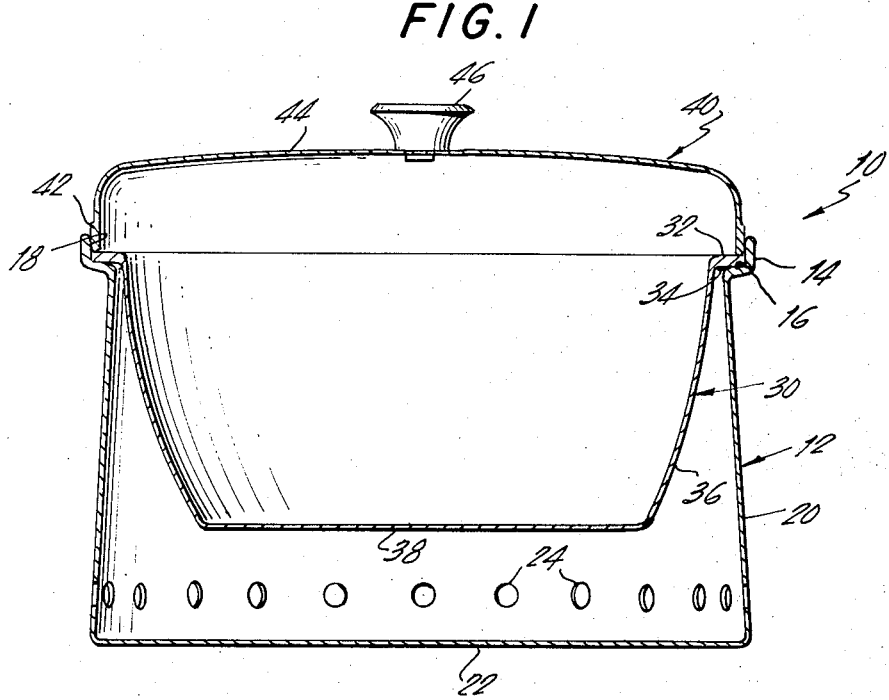

United States Patent [19]
Hajnal

[11] 3,809,063
[45] May 7, 1974

[54] WATERLESS COOKING POT

[76] Inventor: Steven Hajnal, 5600 Riverdale Ave., New York, N.Y. 10471

[22] Filed: Nov. 10, 1972

[21] Appl. No.: 305,224

[52] U.S. Cl.............. 126/373, 220/17, 99/324, 126/390
[51] Int. Cl. ............................................. A47j 27/00
[58] Field of Search ...... 126/373, 390; 220/17, 9 R; 99/324, 325, 413

[56] References Cited
UNITED STATES PATENTS
1,311,990  8/1919  Möller ........................... 220/17 X
3,489,075  1/1970  O'Reilly ........................... 99/413 X
164,964   6/1975  Brown ............................. 220/17 X FOREIGN PATENTS OR APPLICATIONS
532,236  10/1954  Belgium ........................... 99/324
5,268    10/1905  Great Britain ..................... 126/373

Primary Examiner—William F. O'Dea
Assistant Examiner—William C. Anderson

[57] ABSTRACT

A waterless cooking pot comprising a small pot resting inside of a larger pot and a cover for both pots. The larger pot has a series of holes near the bottom.

3 Claims, 2 Drawing Figures

WATERLESS COOKING POT

The present invention relates to a waterless cooking pot suitable for cooking food requiring long cooking time over low heat.

Double boilers have been provided wherein an inner pot nests within an outer pot, the space between containing water. In use, the temperature applied to the inner pot is about the boiling point of water, and therefore accurate slow cooking over low heat may be attained.

A disadvantage of the conventional double boiler is the need to maintain water in the outer pot. When the water boils away, the temperature in the space between the pots sharply rises and the food in the inner pot will scorch.

The present invention provides a waterless cooking pot that avoids all of the disadvantages of the conventional double boiler because the cooking pot of the present invention contains no water, and hence there is no water to boil away. By means of the present invention, the temperature of the inner pot is carefully regulated due to the unique structure of the inner and outer pots and the cover therefor.

Thus, the present invention provides a first and second pot, each pot having a generally cylindrical side wall and a flat, circular bottom wall, and each pot having at the top of the side wall a circumferentially extending, outwardly projecting flange. The second pot is smaller than the first and nests within the first pot with the flange of the second pot resting on the flange of the first pot, the side wall of the second pot sloping away from the side wall of the first pot and the bottom of the second pot being spaced from the bottom of the first pot. The first pot has a vertically extending lip extending upwardly from the first pot flange and a cover is provided which is shaped to rest on the flange of the second pot and abut against the lip of the first pot in sealing relationship therewith. The side wall of the first pot has a plurality of openings extending circumferentially around the pot adjacent the bottom wall thereof and being otherwise free from openings, and the side wall of the second pot is totally free from any openings.

Figure 2:
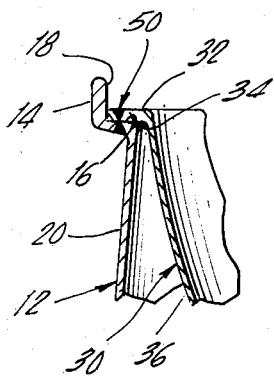

The present invention is illustrated by the accompanying drawing, in which:

FIG. 1 is a view in section of an embodiment of the cooking pot of the invention; and FIG. 2 is an enlarged view in section of a part of another embodiment of the cooking pot of the invention.

Referring to FIG. 1 of the drawing, the waterless cooker 10 is comprised of an outer chamber 12, an inner chamber 30 and a lid 40, all made of aluminum.

In particular, the outer chamber 12 has an upstanding lip 14 joined to the vertical wall 20 by a ledge 16. Adjacent the bottom wall 22 of chamber 12 are a series of holes 24, preferably circular, extending completely around the entire periphery of chamber 12.

The inner chamber 30 has a lip 32 which rests on ledge 16 in contact with inner face 18 of lip 14. Between lip 32 and ledge 16 is an interface 34. Chamber 30 has a vertical wall 36 and a bottom wall 38.

Cover 40 has a sealing portion 42 which fits on top of lip 32 and against inner face 18 of lip 14. On the top of the body 44 of cover 40 is a knob or handle 46.

While FIG. 1 describes an embodiment of the invention wherein inner chamber 30 readily lifts out of outer chamber 12, FIG. 2 shows a preferred embodiment of the invention where chambers 12 and 30 are permanently attached to one another by means of a plurality of welds 50, one of which is being shown in FIG. 2.

In operation, food is placed in inner container 30, cover 40 is placed on lip 32 and the thus assembled cooking pot 10 is placed on a source of heat (not shown) such as a gas or electric range. The pot 10 may then be left on the source of heat for long periods of time without fear of scorching the food in inner container 30, since the openings 24 allow a flow of air through the space between containers 12 and 30, thereby moderating the temperature of walls 36 and 38 and hence the temperature of the food in inner container 30. Since there is no water in the space between containers 12 and 30, there is no danger of water boiling away. Openings 24 also serve as a means of preventing a pressure build-up of air which would occur if containers 12 and 30 were sealed together, either by welds 50 or merely by the weight of container 30, cover 40 and the contents of container 30 bearing against container 12.

Openings 24 must be adjacent the bottom of container 12, since otherwise the heated air escapes too rapidly and an insufficient cooking temperature will be reached.

The cooking pot 10 is useful for cooking foods requiring low cooking times over low (simmer) temperatures, such as rice.

I claim:

1. A waterless cooking pot comprising first and second pots, each pot having a generally cylindrical side wall and a flat, circular bottom wall, and each pot having at the top of the side wall a circumferentially extending, outwardly projecting flange, the second pot being smaller than the first and being within the first pot with the flange of the second pot resting on the flange of the first pot, the side wall of the second pot sloping away from the side wall of the first pot and the bottom of the second pot being spaced from the bottom of the first pot, said first pot having a vertically extending lip extending upwardly from the first pot flange, a cover shaped to rest on the flange of the second pot and abut against the lip of the first pot in sealing relationship therewith, the side wall of the first pot having a plurality of openings extending circumferentially around the pot adjacent the bottom wall thereof and being otherwise free from openings, and the side wall of the second pot being free from openings.

2. The waterless cooking pot according to claim 1, wherein the flanges of the first and second pots are welded together.

3. The waterless cooking pot according to claim 1, wherein the cover and the first and second pots are aluminum.

* * * * *